(12) United States Patent
Kosugi et al.

(10) Patent No.: US 10,747,278 B2
(45) Date of Patent: Aug. 18, 2020

(54) TEMPERATURE MANAGEMENT SYSTEM, INFORMATION PROCESSING APPARATUS AND CONTROLLING METHOD

(71) Applicant: LENOVO (SINGAPORE) PTE. LTD., Singapore (SG)

(72) Inventors: Kazuhiro Kosugi, Yokohama (JP); Yuhsaku Sugai, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 273 days.

(21) Appl. No.: 15/690,071

(22) Filed: Aug. 29, 2017

(65) Prior Publication Data

US 2019/0011964 A1 Jan. 10, 2019

(30) Foreign Application Priority Data

Jul. 10, 2017 (JP) ................................ 2017-134333

(51) Int. Cl.
*G06F 1/20* (2006.01)
*G06F 1/3206* (2019.01)
(Continued)

(52) U.S. Cl.
CPC ............ *G06F 1/206* (2013.01); *G06F 1/20* (2013.01); *G06F 1/32* (2013.01); *G06F 1/324* (2013.01);
(Continued)

(58) Field of Classification Search
None
See application file for complete search history.

(56) References Cited

U.S. PATENT DOCUMENTS

| 7,219,245 B1* | 5/2007 | Raghuvanshi | G06F 1/3203 713/322 |
| 2011/0185209 A1* | 7/2011 | Shimotono | G06F 1/3203 713/323 |

(Continued)

FOREIGN PATENT DOCUMENTS

| JP | 08328698 A | 12/1996 |
| JP | 2001117675 A | 4/2001 |

(Continued)

*Primary Examiner* — Qing Yuan Wu
(74) *Attorney, Agent, or Firm* — Shimokaji IP (57) ABSTRACT

Noise generation caused by sudden rising of a rotational speed of a heat radiation fan when a user has no intension is prevented. A temperature management system located on an information processing apparatus is configured by a system including a processor and scheduled tasks, a performance control system which controls processing ability of the processor and a temperature control system which includes a heat radiation fan and controls a heat radiation amount thereof. The processor executes the scheduled tasks when a state where a usage rate is low, such as an idle state, lasts. The temperature control system controls the rotational speed of the heat radiation fan in accordance with temperatures of electronic devices including the processor. The performance control system lowers processing ability of the processor before the rotational speed of the heat radiation fan rises in accordance with a temperature of the processor which executes the scheduled tasks.

4 Claims, 7 Drawing Sheets

(51) Int. Cl.
*G06F 1/3228* (2019.01)
*G06F 1/324* (2019.01)
*G06F 1/329* (2019.01)
*G06F 9/48* (2006.01)
*G06F 9/50* (2006.01)
*G06F 1/32* (2019.01)

(52) U.S. Cl.
CPC ............ *G06F 1/3206* (2013.01); *G06F 1/329* (2013.01); *G06F 1/3228* (2013.01); *G06F 9/4881* (2013.01); *G06F 9/4893* (2013.01); *G06F 9/5094* (2013.01)

(56) References Cited

U.S. PATENT DOCUMENTS

2015/0346800 A1* 12/2015 Kumar .................. G06F 1/3206
713/323
2017/0038824 A1* 2/2017 An ........................ G06F 9/4418

FOREIGN PATENT DOCUMENTS

| JP | 2007226617 A | 9/2007 |
| JP | 2010039655 A | 2/2010 |

\* cited by examiner

| TEMPERATURE SENSOR | SET TEMPERATURE (°C) | | | | | |
|---|---|---|---|---|---|---|
| | HIGH-SPEED ROTATION | | MIDDLE-SPEED ROTATION | | LOW-SPEED ROTATION | |
| | HTe | HTd | MTe | MTd | LTe | LTd |
| 51a | | | | | | |
| 51b | | | | | | |
| 51c | | | | | | |
| 51d | | | | | | |
| 51e | | | | | | |

TEMPERATURE MANAGEMENT SYSTEM, INFORMATION PROCESSING APPARATUS AND CONTROLLING METHOD

FIELD OF THE INVENTION

The present invention relates to a technique of suppressing rising temperatures of a chassis of an information processing apparatus and further relates to a technique of suppressing noise caused by rotation of a heat radiation fan.

BACKGROUND OF THE INVENTION

In a personal computer (PC) such as a desktop PC, a laptop PC, a tablet terminal and so forth, many electronic devices such as a CPU, a GPU, a chipset, an input/output device and so forth are packaged in the chassis at a high density. These electronic devices generate heat in accordance with an operation of the PC and rising temperatures of the electronic devices and the chassis. The PC which is requested to have comparatively high processing ability is provided with a heat radiation fan which performs control by using temperature sensors disposed in chips of main electronic devices or on a surface of the chassis for management of the temperatures of the electronic devices and the chassis.

When a measured temperature by the temperature sensor rises, the heat radiation fan replaces air in the chassis with outer air. The temperature is determined depending on the heat generation amount of the electronic devices and a heat radiation amount of the heat radiation fan. The heat radiation fan is able to adjust the heat radiation amount by controlling a rotational speed thereof to a plurality of steps. The rotational speed of the heat radiation fan is controlled to increase when the measured temperature by the temperature sensor exceeds a threshold value and to decrease when the measured temperature becomes lower than the threshold value. The CPU generates the largest heat amount in the electronic devices loaded on the PC.

The heat generation amount of the CPU is determined by power consumption. There is known a technique called SpeedStep (a registered trademark) for lowering the power consumption by lowering a clock speed and an operating voltage of the CPU. Further, there is also known a technique called Throttling for intermittently operating the CPU in order to lower the power consumption. It is possible to lower the heat generation amount by lowering the processing ability of the CPU by both of these techniques.

In addition, in the specification of ACPI (Advanced Configuration and Power Interface), two systems, that is, an active cleaning system and a passive cleaning system are defined for heat radiation of a computer system. In the active cleaning system, when the temperature of the computer begins to rise, the heat radiation fan is operated first and then in a case where the temperature keeps rising even when the rotational speed of the heat radiation fan reaches a maximum value, the processing ability of the CPU is lowered.

In the passive cleaning system, when the temperature of the computer begins to rise, the processing ability of the CPU is lowered first and then in a case where the temperature keeps rising even when the processing ability of the CPU is lowered to a lowest level, the heat radiation fan is operated. The active cleaning system is based on a way of thinking that the processing ability is preferred and the passive cleaning system is based on a way of thinking that an increase in power consumption and suppression of noise of the heat radiation fan are preferred.

Patent Document 1 discloses a heat radiation system which gives maximum amenity to a user by harmonizing the processing ability of the processor with the noise generated by rotation of the heat radiation fan. In Patent Document 1, it is described that when it is anticipated that the temperature sensor detects that a measured temperature would exceed a threshold value on the basis of which the rotational speed of the heat radiation fan is raised by one step in a predetermined time, the processing ability of the processor is temporarily lowered and work which is not executed is shifted to a light-load time zone so as not to raise the rotational speed of the heat radiation fan.

Patent Document 2 discloses the invention of dynamically making a switch between the active cleaning system of rotating a cooling fan first by preferring retention of the processing ability of the CPU and the passive cleaning system of lowering the processing ability of the CPU by preferring suppression of the rotational speed of the cooling fan when the temperature of the personal computer rises. In Patent Document 2, it is described that the cleaning system is switched by triggering the kind of a power source used, an opened/closed state of a display panel and so forth.

Patent Document 3 discloses the invention of preventing generation of unnecessary noise caused by a rising rotational speed of the cooling fan that the laptop PC loads. In Patent Document 3, it is described that when the electronic devices such as the CPU, a video chip and so forth are in idle states, rising of the rotational speed of the cooling fan by a temperature sensor which monitors the electronic device concerned is suppressed on the basis of heat radiated from other electronic devices.

Patent Document 4 discloses a portable computer which is provided with two cooling functions, that is, the function of lowering an operating speed of the CPU and the function of rotating an electric fan. In Patent Document 4, it is described that in a case where a user selects a Quiet mode, the electric fan is not operated and only the operating speed of the CPU is lowered and in a case where the user selects a Performance mode, the computer enters a performance preference mode and cooling is performed only by rotation of the electric fan without lowering the operating speed of the CPU.

RELATED ART DOCUMENT

Patent Documents

[Patent Document 1] Japanese Patent No. 5189921
[Patent Document 2] Japanese Patent Application Laid-Open No. 2001-117675
[Patent Document 3] Japanese Patent No. 4448101
[Patent Document 4] Japanese Patent Application Laid-Open No. H8-328698

SUMMARY OF THE INVENTION

The high processing ability of the CPU brings an increase in amenity in use of the CPU and also an increase in heat regeneration amount, and consequently brings a generation of noise due to temperature rising on a chassis surface and an increase in rotational speed of the heat radiation fan. Since the processing ability and rising temperature of the CPU and noise generation work as trade-off factors, it is requested to precisely grasp the needs of the user in order to harmonize both of them. Incidentally, it is pointed out that when in a state where the user does not use the PC for a while, a phenomenon that the temperature of the chassis of the PC that the user holds suddenly rises and the heat radiation fan rotates would occur.

As a result of investigations, it is found that the above-mentioned phenomenon is caused by a scheduled task which is executed by triggering the idle state. When the scheduled task is executed, in general, a usage rate of the CPU reaches 100% and also the heat generation amount is maximized. Even when the temperature of the chassis rises and noise is generated from the heat radiation fan, a user who uses the PC recognizes that the PC is in a normal state and does not care about temperature rising and noise generation. However, when the temperature of the chassis suddenly rises, a user who is not using the PC feels strange. In addition, when the heat radiation fan suddenly rotates at a high speed, there are cases where not only does this get on the user's nerves, but also worries the user about occurrence of abnormality and viral infection. The present invention aims to prevent generation of noise caused by sudden rising of the chassis temperature and rising of the rotational speed of the heat radiation fan which would occur when the user has no intention.

According to one aspect of the present invention, there is provided a method that an information processing apparatus which includes a processor configured to execute a scheduled task when the idle state occurs controls the heat generation amount of the processor. In this method, the information processing apparatus detects a transition to the idle state and lowers the processing ability of the processor in response to transition to the idle state.

It is possible to detect transition to the idle state on the basis of an idle process that an operating system generates in accordance with transition to the idle state and a fluctuation band of usage rates of the processor at a predetermined time elapsed from detection of a user activity. In addition, when recovery from the idle state is detected, it is possible to recover the processing ability of the processor. It is possible to perform detection of recovery from the idle state by detecting execution of a general task other than the user activity and the scheduled task to the information processing apparatus.

According to another aspect of the present invention, there is provided a method that an information processing apparatus which loads a heat radiation fan whose rotational speed is controlled depending on temperatures of electronic devices including a processor and executes a scheduled task when a state where a usage rate of the processor is low and lasts, controls a heat generation amount of the processor. In this method, a task start state that the information processing apparatus executes the scheduled task following a state where the usage rate is not more than a predetermined value is detected and the processing ability of the processor is lowered in response to the detection.

It is possible to detect the execution of the scheduled task on the basis of the usage rate of the processor and a fluctuation band of the usage rates in a predetermined time period, a temperature of the processor and a fluctuation band of the temperatures in a predetermined time period, an identifier of a process of the scheduled task and so forth. It is possible to detect termination of execution of the scheduled task and to restore the processing ability of the processor in response to detection of termination of execution of the scheduled task. The scheduled task may be executed directly after completion of start-up of the information processing apparatus.

According to the above-described aspects of the present invention, it is possible to prevent sudden rising of the chassis temperature when the user has no intention to do so. It is also possible to prevent generation of noise caused by sudden rising of the rotational speed of the heat radiation fan when the user has no intention to do so.

DETAILED DESCRIPTION OF THE INVENTION

[Terms] Terms used in the specification will be described. The "scheduled task" means a program which is executed, in general, when a series of conditions (trigger conditions) are established. A subject which sets the trigger conditions is called an owner of the trigger conditions. There are cases where the trigger conditions are registered into a scheduling function of an OS. At this time, the OS monitors the trigger conditions registered in the scheduling function and executes the scheduled task as the owner of the trigger conditions.

There are cases where a program other than the OS serves as the owner of the trigger conditions. The program concerned monitors trigger conditions that the program itself sets uniquely and executes the scheduled task. There are an event-based trigger condition and a time-based trigger condition. In the present embodiment, an event-based scheduled task that a state where a usage rate of a CPU is low is included as one trigger condition is set as a target. Such a trigger condition as mentioned above is generally called an idle state.

In a certain system, when a computer transitions to a sleep state or a stopped state at a time when the time-based trigger condition is established, there are cases where the scheduled task concerned is executed directly after completion of the next-time start-up of the computer. The present embodiment is able to set also a time-based scheduled task which is executed after detection of the state where the usage rate of the CPU is low directly after completion of start-up of the computer as a target. The general task means a program other than the scheduled task. The idle state corresponds to an operation state of the computer attained when conditions of parameters configured by the low usage rate of the CPU, an observation time, presence/absence of access and user input to a disk and so forth are established.

Here, it is possible to calculate a usage rate Y of the CPU by the following equation when a ratio of a user-mode time of an idle process is Ui, a ratio of a kernel-mode time of the idle process is Ki and an elapsed time is Et.

$$Y=(1-(Ui+Ki)/Et)\times 100\%$$

In the idle state, the usage rate of the CPU reaches a near 0% state.

The task start state means a state obtained directly after the trigger conditions were established and execution of the scheduled task was started and before the heat radiation fan raises the rotational speed. The user activity means inputting into input devices (HID) such as a keyboard, a pointing device and a touch screen, execution of a program instructed from a user, recovery of streaming data and so forth. The user activity indirectly indicates that the user uses the computer in the presence of somebody.

[Information Processing Apparatus]

Figure 1:
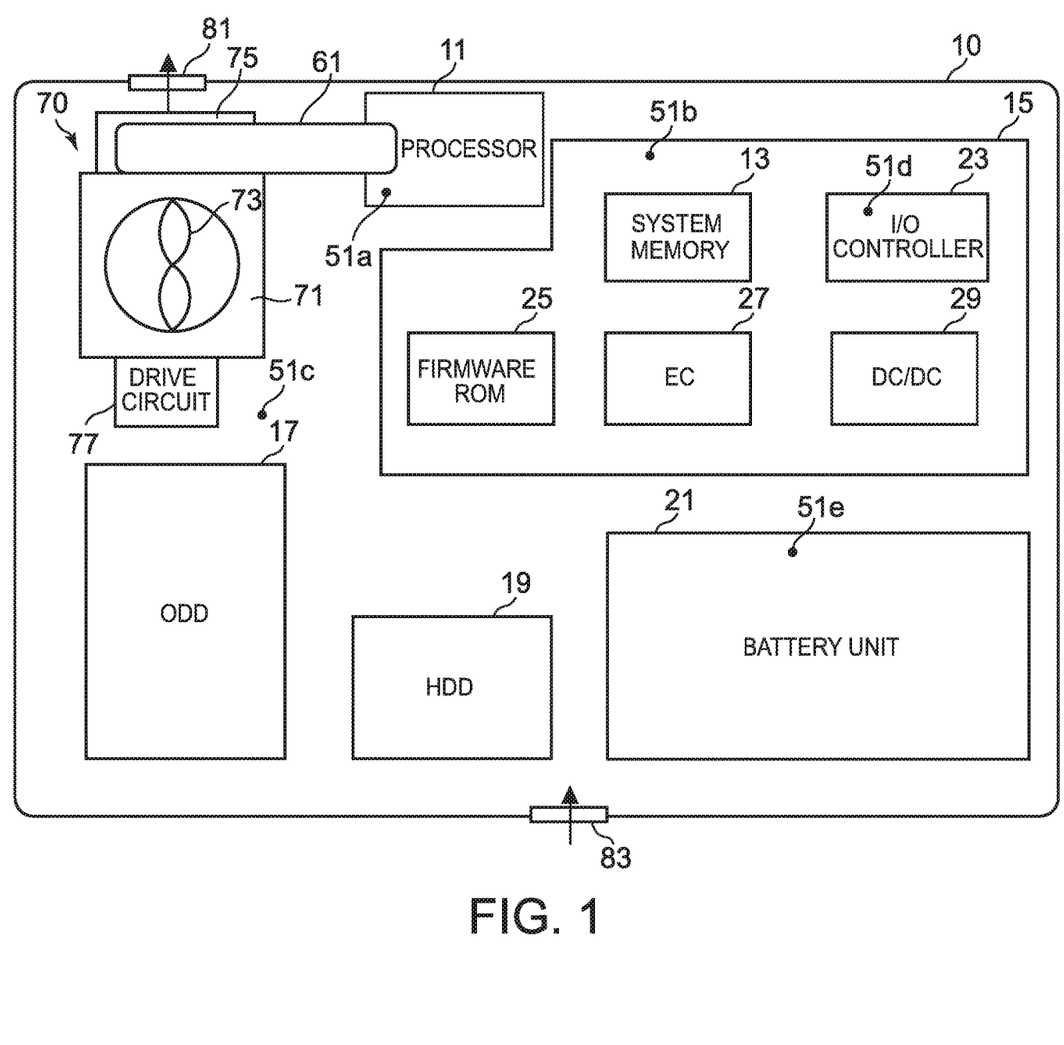
FIG. 1 is a schematic plan view illustrating one example of the inside of a laptop PC 10.
Figure 2:
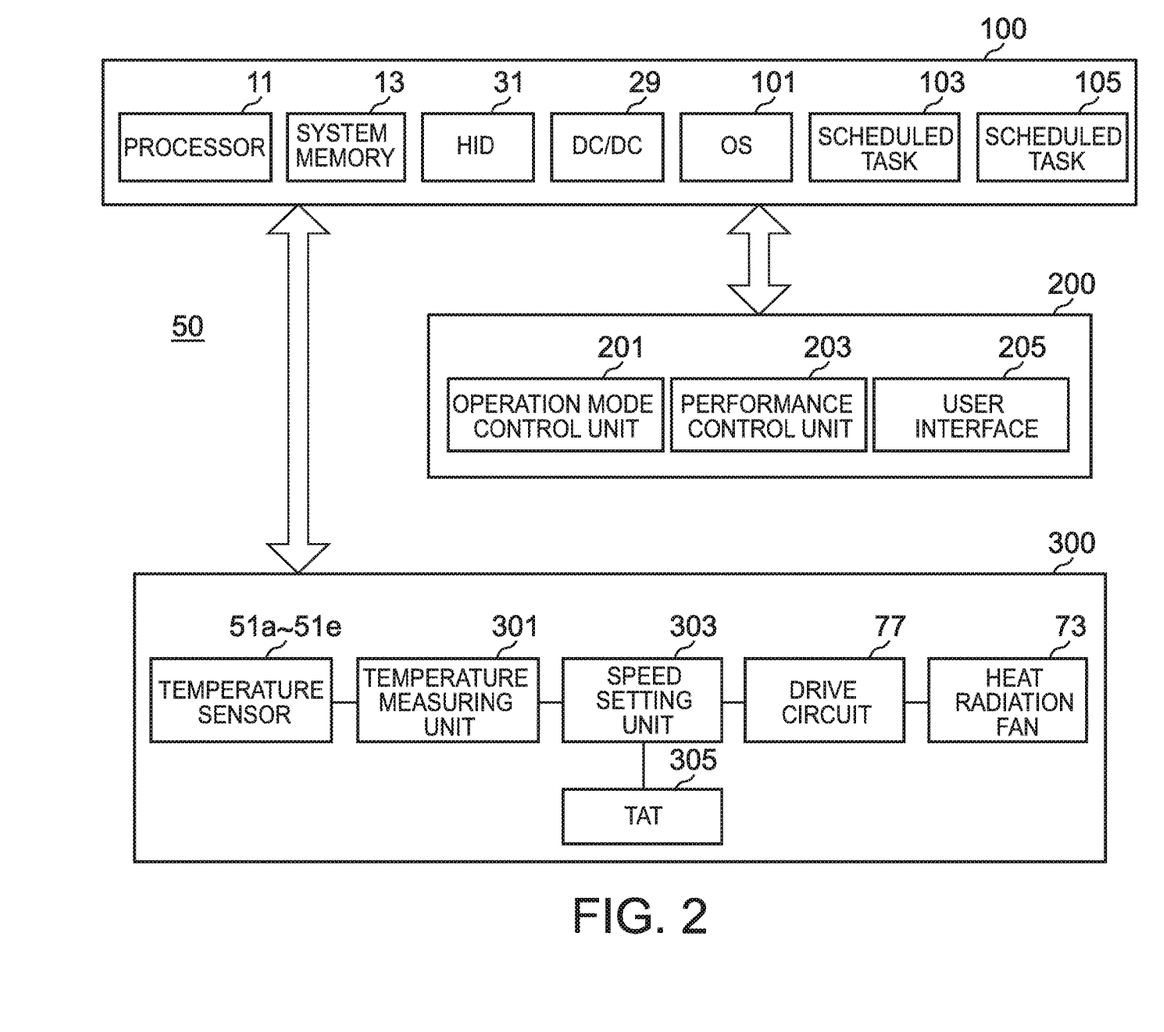
FIG. 2 is a functional block diagram illustrating one example of a temperature management system 50.

FIG. 1 is a plan view schematically illustrating one example of the inside of the laptop PC 10 which is one example of the information processing apparatus. FIG. 2 is a function block diagram illustrating one example of the temperature management system 50 that the laptop PC 10 loads. In the specification, although in the following, description will be made by exemplifying the laptop PC 10 with the heat radiation fan 73 being loaded, the present embodiment is also applicable to a case of suppressing sudden rising of a temperature of a chassis of an information processing apparatus on which the heat radiation fan 73 is not loaded.

In FIG. 1, a heat radiation unit 70, a processor 11, a circuit board 15, an ODD 17, an HDD 19 and a power source unit 21 are disposed in the chassis. A system memory 13, an I/O controller 23, a firmware ROM 25, an embedded controller (EC) 27, a DC/DC converter 29 and so forth are mounted on the circuit board 15. The firmware ROM 25 stores system firmware including an I/O module and an authentication module. The EC 27 is a microcomputer configured by a CPU, a ROM, a RAM and so forth.

The heat radiation unit 70 includes a centrifugal heat radiation fan 73 which is housed in a thin-type fan chamber 71, a heat sink 75 and a drive circuit 77. The heat radiation fan 73 is configured by a plurality of blades and a fan motor which are attached to a rotary shaft. The position of the heat sink 75 aligns with an opening in a side face of the fan chamber 71 and an exhaust port 81 in the chassis. When the heat radiation fan 73 rotates, outer air enters suction ports formed in upper and lower surfaces of the fan chamber 71 through an intake port 83 in the chassis and passes among a plurality of fins of the heat sink 75 while performing heat exchange and is then exhausted.

A heat pipe 61 thermally couples together the heat sink 75 and a heat receiving plate of the processor 11. Electronic devices, for which temperature management is requested, are disposed in the chassis and a plurality of temperature sensors 51a to 51e are disposed on a surface of the chassis. The temperature sensor 51a monitors the temperature of the processor 11. The processor 11 may be the CPU and the GPU or either of them. The processor 11 may be of the type that the CPU and the GPU are formed in the same core. Further, the processor 11 may be of the type that the CPU and the GPU are formed in the individual cores and a load is shared between the CPU and the GPU. The processor 11 may be the plurality of processors.

In one example, the processor 11 conforms to a technique which is called SpeedStep and a technique which is called Throttling. SpeedStep is the technique which is developed by Intel Inc. (a registered trademark) in US and is able to freely set values of an operating voltage and an operating frequency of the processor. In SpeedStep, system firmware sets a maximum operating frequency which is permitted when the system is in a predetermined state to a register of the processor and thereby it is possible to stepwise lower the operating frequency at which the processor concerned operates in reality.

The processor 11 lowers the operating voltage down to a value which is requested for operation of the processor 11 at the operating frequency concerned simultaneously with lowering of the operating frequency. The processor 11 instructs the EC 27 to make the DC/DC converter 29 change the voltage of the processor 11 so as to match the set maximum operating frequency in execution of SpeedStep. The power consumption and the heat generation amount of the processors 11 are lowered by SpeedStep.

Throttling is a function of intermittently operating the processor 11 so as to operate and stop at constant intervals and thereby switching an average processing speed. For execution of Throttling, the system firmware sets validity/invalidity of Throttling and also sets a duty ratio (a throttling rate) into the register of the processor 11. Both SpeedStep and Throttling make it possible to stepwise change the processing ability and the heat generation amount of the processor 11.

In addition, it is also possible to shift to Throttling while maintaining a lowest operating frequency set by SpeedStep by using SpeedStep and Throttling in combination. In the present embodiment, these techniques are utilized in order to adjust the heat generation amount by changing the processing ability of the processor 11 to the plurality of steps. Hereinafter, each step of the processing ability of the processor 11 which is changed by SpeedStep and Throttling or either of them will be called a performance step. When the performance step is 100%, the processor 11 enters a normal state where the processing ability is not lowered.

Incidentally, there exists a CPU of the type having a function of monitoring the temperature of the core and controlling so as to suppress the temperature by lowering the operating frequency and the operating voltage and performing intermittent operation when the number of loads is increased and thereby the temperature rises in CPUs. As one example of such a technique as mentioned above, Intel (a registered trademark) Inc. provides a CPU that incorporates a temperature monitoring and controlling function into a TCC (Thermal Control Circuit). The processor 11 may be of the type provided with the TCC.

In the processor 11, the higher the performance step and the higher the usage rate, the more the power consumption is increased and the more the heat generation amount is also increased. The processor 11 operates in the power consumption according to the load with the power consumption corresponding to the performance step which is set when lowering the processing ability being set as a maximum. Accordingly, the more the performance step is lowered, the longer a time taken for executing a fixed process becomes. The heat that the processor 11 generates raises its own temperature and also raises the temperature in the chassis.

[Configurations of Performance Control System and Temperature Control System]

In FIG. 2, the temperature management system 50 which manages the temperature of a system 100 is configured by the performance control system 200 and a temperature control system 300. Although both of the systems manage the heat of the laptop PC 10 in terms of the heat generation amount and the heat radiation amount, operations thereof are independent of each other. The system 100 is configured by hardware such as the processor 11, a system memory 13, an HID 31, the DC/DC converter 29 and so forth and software such as an OS 101, scheduled tasks 103 and 105 and so forth.

The HID 31 corresponds to a device by which the user physically accesses the laptop PC and inputs data into the laptop PC such as the keyboard, the mouse, the touch screen and so forth. Input into the HID 31 corresponds to use of the laptop PC 10 by the user. The DC/DC converter 29 supplies power to the processor 11 and other electronic devices at a predetermined voltage. The scheduled task 103 is registered to a task scheduling function of the OS 101 and is executed. In one example, Microsoft (a registered trademark) Corp. defines a case where the CPU usage rate and input/output to/from a disk are 0% for a time period corresponding to 90% of the past 15 minutes and no input into the keyboard and the mouse is made in that time period as the idle state. In addition, Microsoft Corp. also defines the end of the idle state in a case where input by user is made after Task Scheduler Service sensed the idle state.

The scheduled task 105 is executed by using the idle state that an application used for performing virus countermeasures and computer diagnosis defines as a trigger condition. In a case where the owner of the trigger condition permits change of the trigger condition, a user having knowledge is able to change the trigger condition. However, many users do not attempt to change it and keep default settings. In a case where changing of the trigger condition is not allowed, the user is not allowed to execute the scheduled task at an intentional timing.

The performance control system 200 is configured by an operation mode control unit 201, a performance control unit 203 and a user interface 205. The operation mode control unit 201 operates by cooperation of a state monitoring program which is executed on the OS 101 with a middleware which is incorporated into a kernel of the OS 101 and controls the processing ability of the processor 11. The middleware monitors the idle process which is generated when the OS 101 is in the idle state. The idle process is dispatched in priority order higher than those of other processes and therefore is executed earlier than the scheduled task 103 when the OS 101 enters the idle state.

The middleware is able (that is, makes it possible (the same is true of the following)) to hook the idle process. The state monitoring program is able to recognize that the system 100 transitions to the idle state from the idle process which is hooked using the middleware. At this time, the idle state that the operation mode control unit 201 recognizes matches the idle state that the OS 101 which is the owner of the trigger condition recognizes. The operation mode control unit 201 is able to acquire the usage rate of the processor 11 from the OS 101 and the processor 11.

The operation mode control unit 201 is also able to define the idle state of its own by utilizing parameters such as an average usage rate of the processor 11 in a predetermined monitoring time period, presence/absence of the user activity, a time of disk access and so forth. As one example, the operation mode control unit 201 is able to recognize that the processor 11 is in the idle state when the usage rate at the predetermined time elapsed from final detection of the user activity is almost 0%. The operation mode control unit 201 is able to recognize its own uniquely defined idle state and to lower the processing ability of the processor 11 before the idle state that the owner of the trigger condition defines is established and the scheduled tasks 103 and the 105 are executed.

When the general task is executed in the idle state, since the process of the general task is high in priority order, the right to use the processor 11 given to the idle process is deprived. The operation mode control unit 201 is able to monitor this state and to recognize end of the idle state or start of execution of the general task in the idle state. The operation mode control unit 201 is able to recognize the task start state and termination of execution of the scheduled tasks 103 and 105 on the basis of the usage rate and the power consumption of the processor 11, the measured temperature by the temperature sensor 51*a* and so forth.

The performance control unit 203 includes system firmware and sets the performance step in the register of the processor 11 according to instructions from the operation mode control unit 201. The user interface 205 provides a screen that the user uses in order to set the operation mode of the performance control system 200. The temperature control system 300 includes the temperature sensors 51*a* to 51*e*, a temperature measuring unit 301, a speed setting unit 303, a thermal action table (TAT) 305, the drive circuit 77 and the heat radiation fan 73. The temperature measuring unit 301, the speed setting unit 303 and the TAT 305 are configured as the EC 27. The drive circuit 77 controls a voltage to be applied to a motor by using pulse width modulation according to instructions from the speed setting unit 303 and stepwise controls the rotational speed of the heat radiation fan 73.

[Operation of Temperature Control System]

Figure 3:
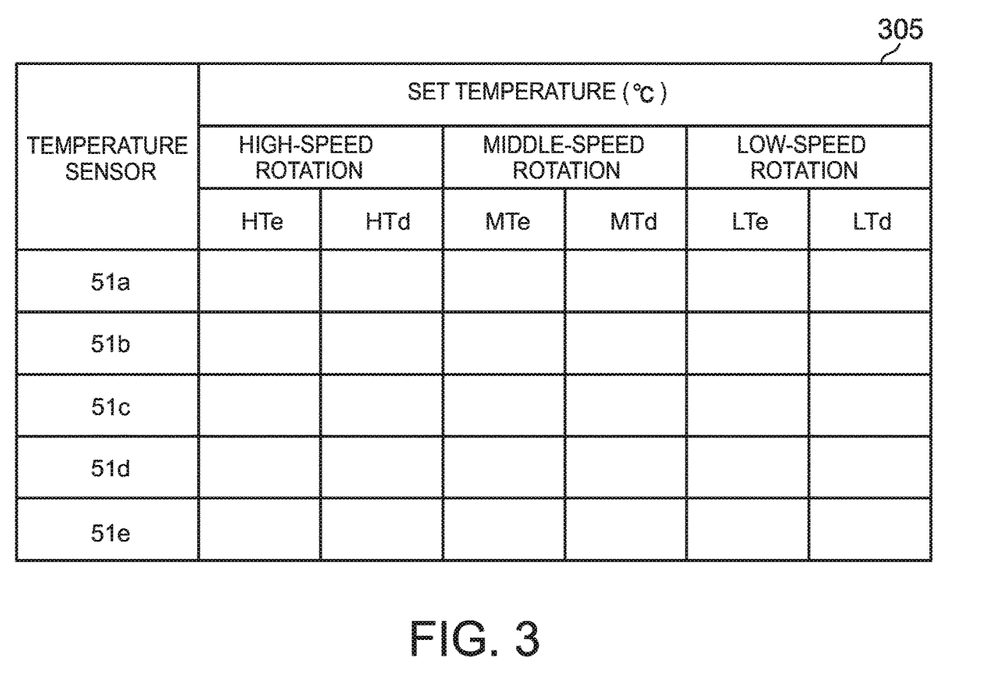
FIG. 3 is a diagram illustrating one example of a data structure of a TAT 305.

Next, an operation of the temperature control system 300 will be described. FIG. 3 is a diagram for explaining one example of a data structure of the TAT 305. The TAT 305 describes set temperatures on the basis of which the operation state of the heat radiation fan 73 is changed among four speed steps of stop, low-speed rotation, a middle-speed rotation and high-speed rotation in units of the temperature sensors 51*a* to 51*e*. It is not particularly requested to limit the number of the speed steps. The set temperatures are configured by enable temperatures LTe, MTe and HTe and disable temperatures LTd, MTd and HTd for the respective operation states and a hysteresis property is formed between a case where the rotational speed changes in a rising direction and a case where the rotational speed changes in a lowering direction.

The enable temperatures LTe, MTe and HTe are temperatures that in a case where the measured temperature by the temperature sensor is on a rising trend, the rotational speed shifts from a speed step which is slow by one step to the speed step concerned. The disable temperatures LTd, MTd and HTd are temperatures that in a case where the measured temperature by the temperature sensor is on a lowering trend, the rotational speed shifts from the speed step concerned to the speed step which is slow by one step. Here, the speed step which is slower than the low-speed rotation is a stopped state.

Set temperatures which are set in correspondence with the respective temperature sensors 51*a* to 51*e* are set so as to operate the heat radiation fan 73 at a rotational speed which is as low as possible such that a surface temperature of a predetermined place of the chassis does not exceed a predetermined value or to operate the heat radiation fan 73 at an appropriate rotational speed such that the temperature of each electronic device does not exceed a critical temperature. In a case where the temperature of each electronic device rises and exceeds the critical temperature, the laptop PC 10 stops the operation or shifts to a suspended state or a hibernation state.

The speed setting unit 303 raises the rotational speed of the heat radiation fan 73 by one step when the measured temperature by any one of the temperature sensors 51*a* to 51*e* reaches the enable temperature LTe, MTe or HTe, lowers the rotational speed of the heat radiation fan 73 by one step when the measured temperatures by all of the temperature sensors 51a to 51e lower to values less than the disable temperatures MTd and HTd, and stops the heat radiation fan 73 when the measured temperatures become less than the disable temperature LTd. Incidentally, also in a case where the rotational speed shifts from the stopped state to the low-speed rotation, it is regarded that the rotational speed rises.

The more the rotational speed of the heat radiation fan 73 rises, the more the friction sound of air when passing through the exhaust port 81 becomes more noise. The temperature control system 300 controls the rotational speed of the heat radiation fan 73 on the basis of the measured temperatures by the temperature sensors 51a to 51e and the TAT 305. In addition, the heat generation amount of the system 100 depends on the power consumption of each electronic device. Since the heat generation amount of the processor 11 is the largest in the electronic devices, the rotational speed of the heat radiation fan 73 mainly depends on the power consumption of the processor 11. In a case where the scheduled tasks 103 and 105 involving high usage rates are executed, the rotational speed of the heat radiation fan 73 rises.

[Operation of Performance Control System]

Figure 4:
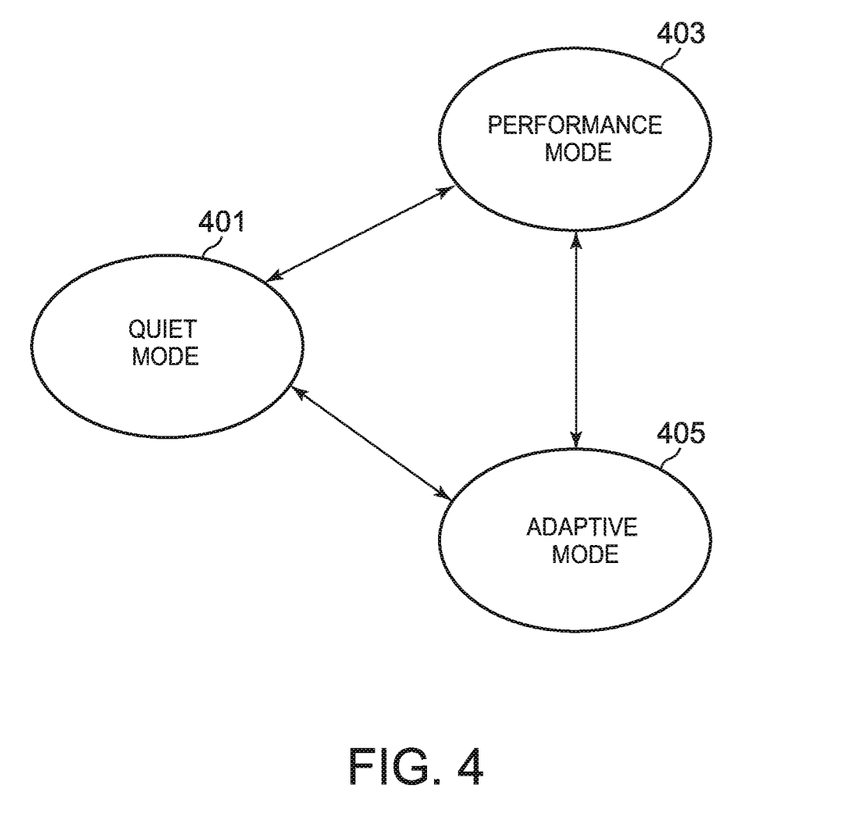
FIG. 4 is a diagram illustrating one example of a state transition of a performance control system 200.

Next, an operation of the performance control system 200 will be described. The performance control system 200 indirectly suppresses temperature rising on the chassis surface and further suppresses rotational speed rising of the heat radiation fan 73 by controlling the heat generation amount of the processor 11. FIG. 4 is a state transition diagram of the performance control system 200. The operation mode control unit 201 makes the performance control system 200 transition among three operation modes, that is, a quiet mode 401, a performance mode 403 and an adaptive mode 405 in one example. The quiet mode 401 corresponds to the operation mode for lowering the performance step prior to rising of the rotational speed of the heat radiation fan 73 when the temperature rises in order to prefer quietness to performance.

Here, suppression of the rotational speed of the heat radiation fan 73 means any one of or a plurality of operations of lowering the heat generation amount of the processor 11 so as not to rotate the heat radiation fan 73 which is at rest, for stopping the heat radiation fan 73 which is rotating and for rotating the heat radiation fan 73 which is rotating at a high rotational speed at a low rotational speed of such an extent that noise may not cause trouble.

The operation mode control unit 201 is able to lower the performance step to such an extent that, for example, the heat radiation fan 73 does not rotate even when the usage rate of the processor 11 is 100% in the quiet mode 401. Alternatively, the operation mode control unit 201 is able to lower the performance step such that the rotational speed of the heat radiation fan 73 does not rise to such an extent that the noise causes trouble even when the usage rate of the processor 11 reaches 100% in the quiet mode 401. The processor 11 operates with power consumption corresponding to the set performance step being defined as an upper limit value and in power consumption according to the task concerned in the quiet mode 401.

The performance mode 403 corresponds to the operation mode for raising the rotational speed of the heat radiation fan 73 up to a maximum speed first when the temperature rises in order to prefer performance to quietness and for lowering the performance step in a case where the temperature rises more. The performance mode 403 is executed in a state where the laptop PC 10 is at rest on the desk. The adaptive mode 405 corresponds to the operation mode for detecting such a state that the laptop PC 10 is used on the knees of the user, such a state that the intake port 83 or the exhaust port 81 is clogged in such a usage mode that the chassis is opened and so forth and thereby controlling the operation while harmonizing the performance step and the rotational speed of the heat radiation fan 73.

The user sets an automatic mode or a manual mode to the operation mode control unit 201 via the user interface 205. The operation mode control unit 201 which is set to the manual mode operates only in the set operation mode. The operation mode control unit 201 which is set to the automatic mode transitions between the performance mode and the adaptive mode 405 in accordance with changes in vibration acquired from an acceleration sensor of the system 100 and the posture of the chassis. Further, the operation mode control unit 201 transitions between the performance mode 403 or the adaptive mode 405 and the quiet mode 401 in procedures which will be described with reference to FIG. 5 to FIG. 7.

[Procedure of Suppressing Rotational Speed Based on Specification of Idle State]

Figure 5:
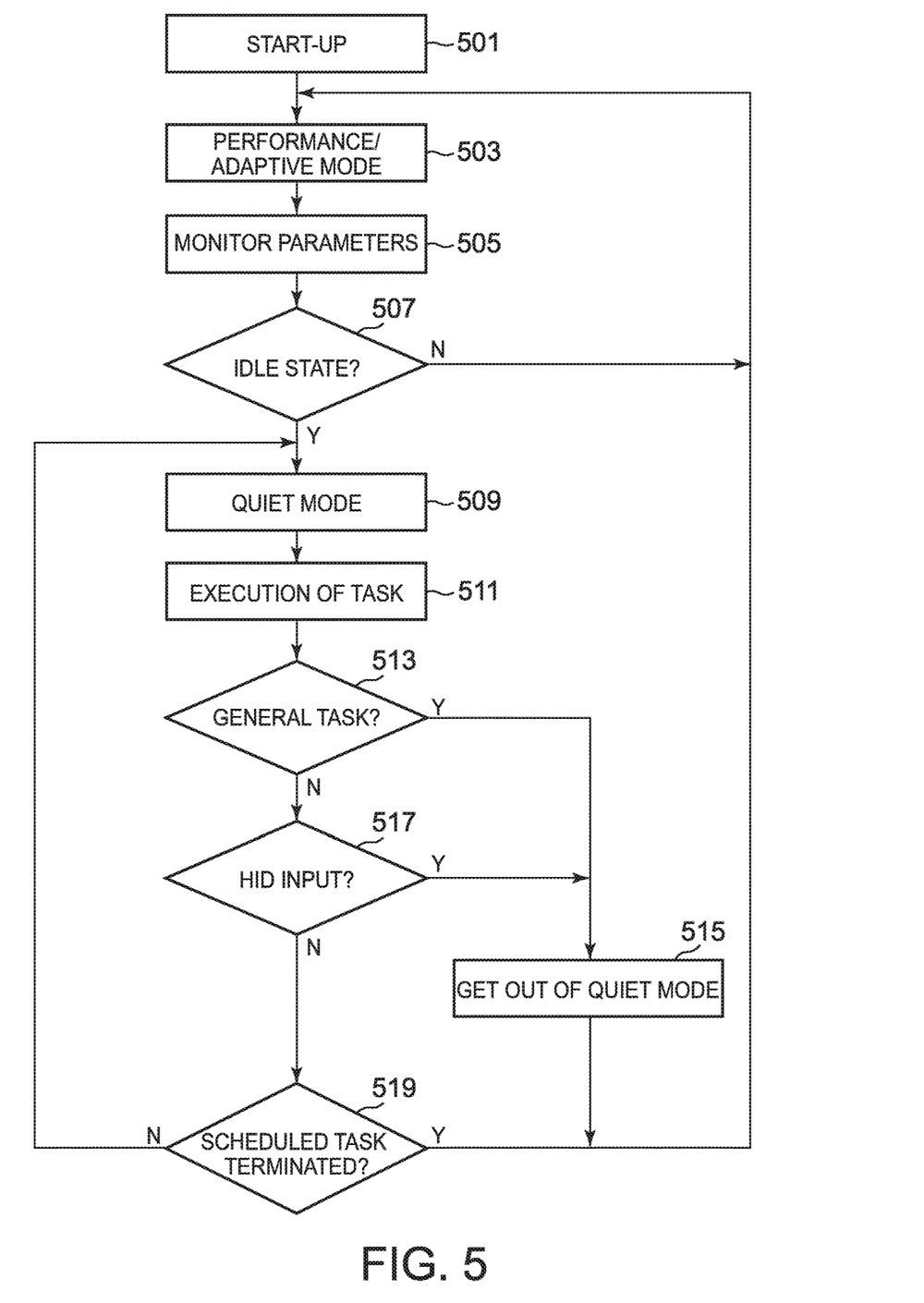
FIG. 5 is a flowchart illustrating one example of one procedure that the temperature management system 50 suppresses a rotational speed of a heat radiation fan 73.

FIG. 5 is a flowchart illustrating one example of the procedure in accordance with which the temperature management system 50 suppresses the rotational speed of the heat radiation fan 73. In a case where start-up of the laptop PC 10 is completed in block 501, the operation mode control unit 201 shifts to the performance mode 403 or the adaptive mode 405 in block 503. The operation mode control unit 201 acquires a parameter used for deciding whether the idle state is established from the system 100 in block 505. The idle process that the OS 101 generates when the system 100 shifts to the idle state may be used as the parameter of the idle state for the scheduled task 103 which is executed in the trigger condition the owner of which is the OS 101.

A monitoring time that the trigger condition concerned specifies, the usage rate of the processor 11, presence/absence of the user activity and so forth may be used as the parameters of the idle state for the scheduled task 105 which is executed in the trigger condition the owner of which is the application program. Alternatively, the usage rate and the monitoring time on the basis of which the operation mode control unit 201 is able to predict establishment of the trigger condition of the scheduled task 105 may be used as the parameters.

The operation mode control unit 201 shifts to block 509 when establishment of the idle state is recognized from the acquired parameters in block 507. When establishment of the idle state is not recognized, the operation mode control unit 201 returns to block 503 and maintains the performance mode 403 or the adaptive mode 405. The operation mode control unit 201 shifts to the quiet mode 401 in block 509. Before shifting to the quiet mode 401, the heat generation amount of the processor 11 is small and therefore the operation mode control unit 201 presumes that the heat radiation fan 73 is at rest.

The possibility that the scheduled tasks 103 and 105 which use the idle state as the trigger condition would be executed when the user does not use the computer is high. Therefore, when the rotational speed of the heat radiation fan 73 suddenly rises, the user feels strange. The operation mode control unit 201 instructs the performance control unit 203 so as to lower the processor 11 to a predetermined performance step before the rotational speed of the heat radiation fan 73 rises. Since the task is executed in the quiet mode 401 in block 511, the rotational speed of the heat radiation fan 73 is suppressed. There are cases where the general task(s) is/are included in the tasks to be executed in addition to the scheduled tasks 103 and 105. In general, it is thought that it is desirable to execute the scheduled tasks 103 and 105 which are executed in the idle state at the arrival of the idle state.

In the present embodiment, although the time taken until termination is delayed in comparison with execution in the performance mode 403 or the adaptive mode 405, it is possible to more reduce the influence than a case where the heat radiation fan 73 is stopped by executing the scheduled tasks 103 and 105 in the quiet mode 401. Incidentally, even when recognition of the idle state and execution timings of the scheduled tasks 103 and 105 are mutually replaced and the operation mode control unit 201 shifts to the quiet mode 401 directly after execution of the scheduled tasks 103 and 105, it is possible to suppress the rotational speed of the heat radiation fan 73 because there is a time delay until the temperature of the processor 11 rises.

The operation mode control unit 201 decides whether the general task is executed in block 513. When the general task is not executed, the operation mode control unit 201 executes the scheduled tasks 103 and 105 while maintaining the quiet mode 401 and shifts to block 517. When the general task is executed, the operation mode control unit 201 shifts to block 515, gets out of the quiet mode 401, shifts to the performance mode 503 or the adaptive mode 503 and returns to block 503.

At this time, there are cases where execution of the scheduled tasks 103 and 105 is not terminated. When the scheduled tasks 103 and 105 are executed at a high performance step, the rotational speed of the heat radiation fan 73 rises and the noise is generated. However, since the noise generated in this case is caused by use of the laptop PC 10, the user does not feel strange. The operation mode control unit 201 decides whether input is made into the HID 31 in block 517. When the input is detected, the operation mode control unit 201 shifts to block 515, while when the input is not detected, the operation mode control unit 201 shifts to block 519.

The operation mode control unit 201 decides whether execution of the scheduled tasks 103 and 105 is terminated in block 519. The operation mode control unit 201 is able to recognize termination of execution of the scheduled tasks 103 and 105 from lowering of the usage rate of the processor 11 down to a value less than a fixed value, deletion of the process and so forth. The operation mode control unit 201 returns to block 503 when execution of the scheduled tasks 103 and 105 is terminated and returns to block 509 when execution of the scheduled tasks 103 and 105 is not terminated.

[Procedure of Suppressing Rotational Speed Based on Specification of Task Start State]

Figure 6:
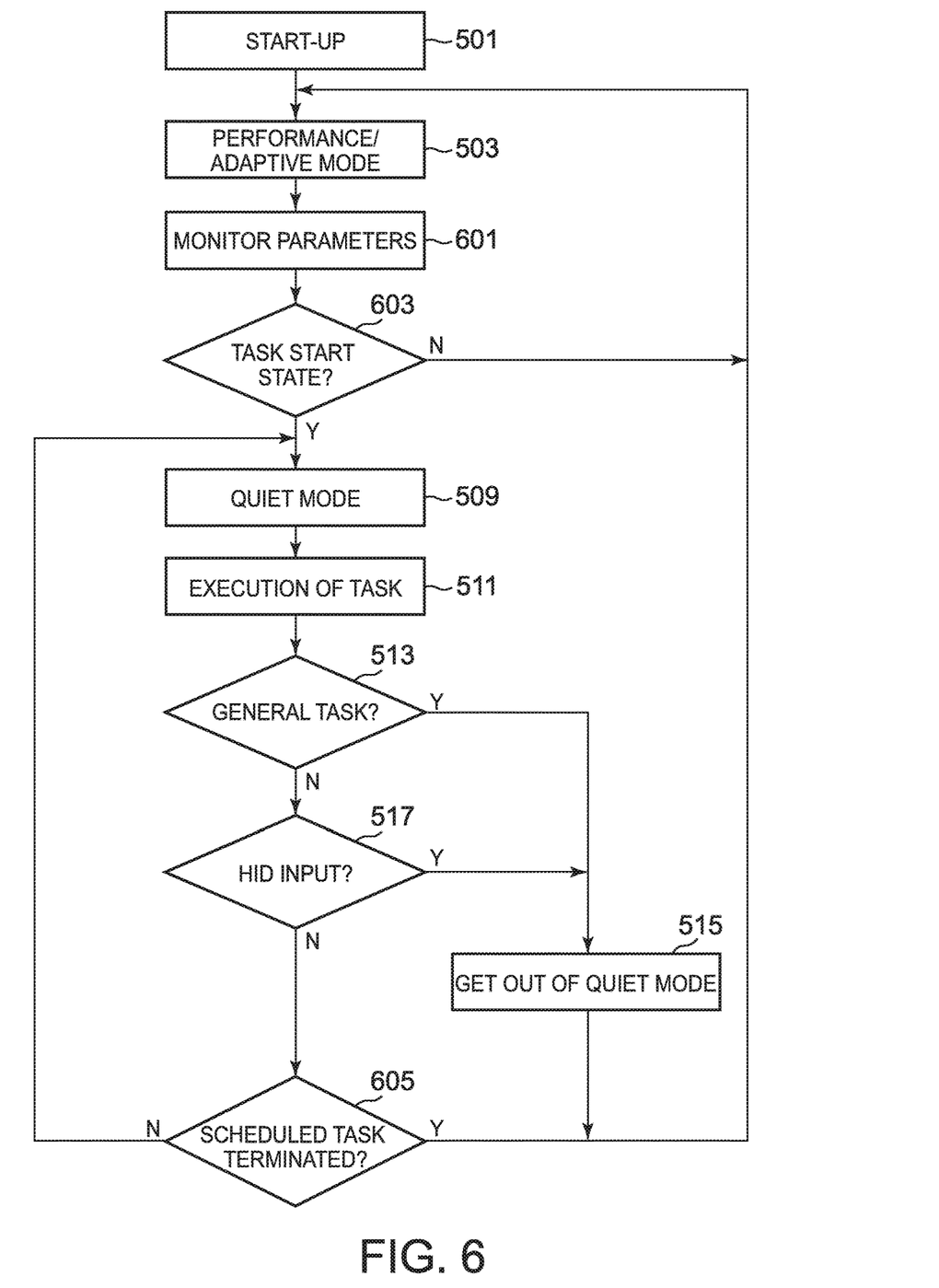
FIG. 6 is a flowchart illustrating one example of another procedure that the temperature management system 50 suppresses the rotational speed of the heat radiation fan 73.

FIG. 6 is a flowchart illustrating one example of another procedure in accordance with which the temperature management system 50 suppresses the rotational speed of the heat radiation fan 73. Although in the procedure in FIG. 5, the operation mode control unit 201 recognizes the idle state and then shifts to the quiet mode 401, the scheduled tasks 103 and 105 are executed and thereafter the rotational speed is suppressed by shifting to the quiet mode in the procedure in FIG. 6.

In the procedure in FIG. 6, blocks 601, 603 and 605 are adopted in place of blocks 505, 507 and 519 in FIG. 5. Although the procedure is the same as the procedure in FIG. 5 in other respects, description thereof is omitted. As one method of executing processes in blocks 601 and 603, it is possible to decide a task execution state when the operation mode control unit 201 detects the processes of the scheduled tasks 103 and 105. Here, identifiers of the scheduled tasks 103 and 105 to be executed are used as the parameters. Another method of executing processes of blocks 601 and 603 will be described with reference to FIG. 7.

Figure 7A:
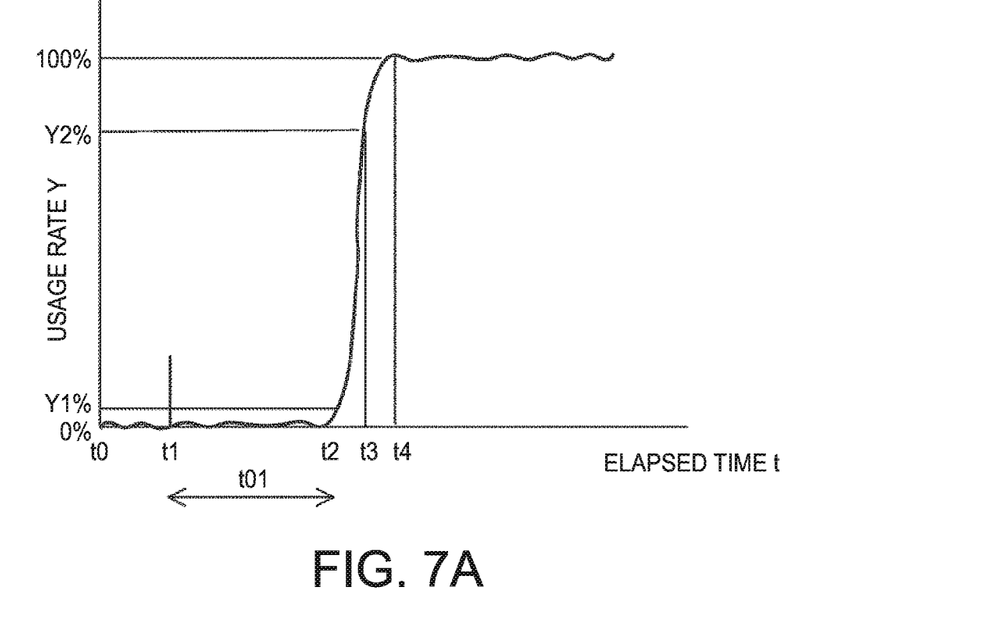
FIGS. 7A and 7B are diagrams illustrating one example of a method of executing processes in blocks 601 and 603 in FIG. 6.
Figure 7B:
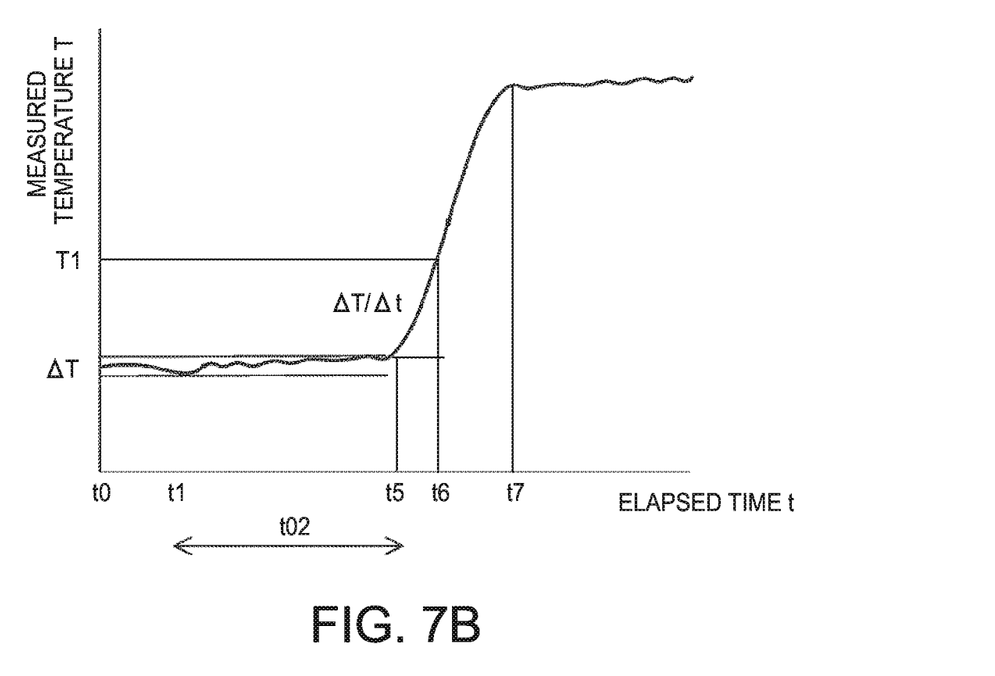

FIG. 7A illustrates one example of a transition of the usage rate of the processor 11 and FIG. 7B illustrates one example of a transition of the measured temperature by the temperature sensor 51*a* when the user does not use the laptop PC 10. In FIG. 7A, there is no user activity from a time t0 to a time t1 and the usage rate of the processor 11 exhibits a transition around 0%. Although the user activity is generated at the time t1, the usage rate also exhibits the transition around 0% after that up to a time t2.

When this state meets the trigger conditions of the scheduled tasks 103 and 105, the scheduled tasks 103 and 105 would be executed at the time t2. However the operation mode control unit 201 does not perform a process of recognizing the idle state before execution of the scheduled tasks 103 and 105 and shifting to the quiet mode 401. The usage rate begins increasing steeply at the time t2, reaches a threshold value Y2% at a time t3 and reaches 100% at a time t4. The operation mode control unit 201 monitors the usage rate by utilizing a usage rate meter that the OS 101 provides or other alternative measures.

The usage rate when the scheduled tasks 103 and 105 which use the idle state as the trigger condition are executed exhibits a characteristic change in comparison with the usage rate in a case where other tasks are executed. When the usage rate reaches the threshold value Y2% and the usage rate in a monitoring time period $t_{o1}$ from the time t1 to the time t2 is not more than a threshold value Y1%, the operation mode control unit 201 is able to decide that execution of the scheduled tasks 103 and 105 is started and a task start state is established in block 603.

At this time, it is possible to specify the time t2 by a change rate of the usage rate per unit time. It is possible to set the threshold value Y1% to a value corresponding to the usage rate in the idle state, for example, to about 1% to 2% and it is also possible to set the threshold value Y2% to a value which allows suppression of rotational speed rising of the heat radiation fan 73 by lowering the processing ability of the processor 11 by triggering a timing of the above-mentioned threshold value setting. The user activity, the monitoring time period $t_{o1}$ and the usage rate of the processor 11 are used as the parameters at this time.

FIG. 7B illustrates one example of the measured temperature by the temperature sensor 51*a* corresponding to the transition diagram in FIG. 7A. The measured temperature by the temperature sensor 51*a* is maintained almost constant from the time t0 to a time t5 (t5>t2). When the usage rate steeply rises at the time t2, the measured temperatures begins steeply rising at the time t5 with a certain time delay, reaches a measured temperature T1 (a threshold value) at a time t6 and exceeds the enable temperature at a time t7, and thereby the rotational speed of the heat radiation fan 73 rises. Also the measured temperature by the temperature sensor 51*a* obtained at that time point exhibits a characteristic change in comparison with that in a case where the other task is executed.

The operation mode control unit 201 is able to decide that execution of the scheduled tasks 103 and 105 is started and the task start state is established in block 603 when the measured temperature acquired from the temperature measurement unit 301 reaches the threshold value T1, the fluctuation band of the measured temperature in a monitoring time period $t_{o2}$ from the time t1 to the time t5 falls within a range of a fluctuation band ΔT in the idle state. At this time, it is possible to specify the time t5 by a change rate of the measured temperature per unit time. The operation mode control unit 201 is able to dynamically change the threshold value T1 in accordance with an environmental temperature in the chassis. The user activity, the monitoring time period $t_{o2}$ and the measured temperature of the processor 11 which are obtained at that time point are used as the parameters.

It is also possible to adopt an average value of the power consumption of the processor 11 per predetermined time as the parameter in place of the usage rate and the temperature of the processor 11. The operation mode control unit 201 is able to recognize termination of execution of the scheduled tasks 103 and 105 also from transition of the temperature of the processor 11 in the fluctuation band ΔT and transition of the power consumption in the predetermined fluctuation band in block 605, in addition to the process in block 519 in FIG. 5.

There is a scheduled task which is executed directly after this-time start-up of the laptop PC 10 in a case where it is not possible to execute the task at a time which is set from the previous start-up to the previous stop in the time-based scheduled tasks. The system 100 is able to recognize completion of start-up of the computer from a situation that a booting process is terminated and thereby the usage rate of the processor 11 lowers to a value less than the predetermined value. Also in a case where the system 100 executes the scheduled tasks by using a situation that the usage rate lowers directly after completion of start-up of the computer as the trigger condition, the operation mode control unit 201 is able to shift to the quiet mode 401 in accordance with the procedure in FIG. 6 before the rotational speed of the heat radiation fan 73 rises.

Although the present invention has been described so far using the specific embodiments illustrated in the drawings, it goes without saying that the present invention is not limited to the embodiments illustrated in the drawings and any configuration which has been known so far may be adopted as long as the effect of the present invention is exhibited.

We claim:

1. A method, wherein an information processing apparatus which includes at least a processor configured to execute a scheduled task when an idle state occurs, to control a heat generation amount of the processor, the method comprising:
    shifting, from a performance mode or an adaptive mode in the information processing apparatus to a quiet mode in the information processing apparatus as a result of establishing an idle state of the processor;
    the quiet mode corresponds to a lowering of a performance step of the processor;
    detecting a transition to the idle state;
    the detected transition to the idle state triggers the scheduled task which is executed in the quiet mode;
    lowering a setting of a performance step of the processor in response to the transition to the idle state;
    wherein the performance step is a processing ability of the processor;
    wherein a lower performance step corresponds to lower power consumption and lower heat generation;
    detecting a recovery from the idle state which recovery corresponds to a recovery of the processing ability of the processor;
    the step of detecting the recovery from the idle state includes detecting that general task other than the scheduled task is executed;
    wherein the executed general task takes the information processing apparatus out of the quiet mode; and
    recovering the setting of the performance step of the processor in response to the recovery from the idle state.

2. The method according to claim 1, wherein:
    the step of detecting the transition includes detecting an idle process that an operating system generates in accordance with the transition to the idle state.

3. The method according to claim 1, wherein:
    the step of detecting the transition includes detecting a usage rate of the processor at a predetermined time elapsed from a final detection of a user activity.

4. The method according to claim 1, wherein:
    the step of detecting the recovery from the idle state includes detecting a user activity to the information processing apparatus.

* * * * *